United States Patent
Francois et al.

(10) Patent No.: US 12,072,002 B2
(45) Date of Patent: Aug. 27, 2024

(54) RING GEAR FOR AN AIRCRAFT MECHANICAL GEARBOX

(71) Applicant: SAFRAN TRANSMISSION SYSTEMS, Colombes (FR)

(72) Inventors: Loïc Francois, Moissy-Cramayel (FR); Boris Pierre Marcel Morelli, Moissy-Cramayel (FR); Florent Lejeune, Moissy-Cramayel (FR)

(73) Assignee: Safran Transmission Systems, Colombes (FR)

( * ) Notice: Subject to any disclaimer, the term of this patent is extended or adjusted under 35 U.S.C. 154(b) by 0 days.

(21) Appl. No.: 18/534,131

(22) Filed: Dec. 8, 2023

(65) Prior Publication Data

US 2024/0191779 A1     Jun. 13, 2024

(30) Foreign Application Priority Data

Dec. 9, 2022  (FR) .......................................  2213078

(51) Int. Cl.
| | |
|---|---|
| *F16H 55/17* | (2006.01) |
| *F16H 1/34* | (2006.01) |
| *F16H 48/11* | (2012.01) |
| *F16H 57/08* | (2006.01) |
| *F16H 1/32* | (2006.01) |

(52) U.S. Cl.
CPC ............ *F16H 1/34* (2013.01); *F16H 48/11* (2013.01); *F16H 55/17* (2013.01); *F16H 57/082* (2013.01); *F16H 2001/327* (2013.01); *F16H 2055/176* (2013.01)

(58) Field of Classification Search
CPC ...... F16H 2055/176; F16H 1/34; F16H 48/11; F16H 57/082; F16H 2001/327
See application file for complete search history.

(56) References Cited

U.S. PATENT DOCUMENTS

| | | | | |
|---|---|---|---|---|
| 5,391,125 | A | * | 2/1995 | Turra ..................... F16H 1/2836 475/331 |
| 2019/0170240 | A1 | * | 6/2019 | Charrier .............. F16H 57/0482 |
| 2020/0166121 | A1 | * | 5/2020 | Di Giovanni ....... F16H 57/0479 |
| 2020/0325975 | A1 | * | 10/2020 | Ernstson ................. F16H 55/02 |

FOREIGN PATENT DOCUMENTS

| | | |
|---|---|---|
| EP | 1 013 970 A2 | 6/2000 |
| FR | 3 072 749 A1 | 4/2019 |
| WO | WO 2019/007915 A1 | 1/2019 |

OTHER PUBLICATIONS

French Search Report & Written Opinion mailed May 19, 2023, issued in corresponding French Application No. FR2213078, filed Dec. 9, 2022, 8 pages total.

* cited by examiner

*Primary Examiner* — Tisha D Lewis
(74) *Attorney, Agent, or Firm* — Christensen O'Connor Johnson Kindness PLLC

(57) ABSTRACT

A ring gear for an aircraft mechanical gearbox, the ring gear having an annular shape about an axis and having an internal toothing at its internal periphery, an external annular flange or splines at its external periphery, and an annular web extending between the internal toothing and the external flange or splines. The web can include an annular row of arms which are distributed about the axis, these arms connecting the internal toothing to the external flange or splines and being formed in a single piece with the internal toothing and the external flange or splines.

19 Claims, 6 Drawing Sheets

RING GEAR FOR AN AIRCRAFT MECHANICAL GEARBOX

CROSS-REFERENCE TO RELATED APPLICATION

This application claims priority to FR 2213078, filed Dec. 9, 2022, the disclosure of which is hereby expressly incorporated by reference herein in its entirety.

BACKGROUND

The prior art comprises documents FR-A1-3 025 780, FR-B1-3 066 792, FR-B1-3 071 023, FR-3 072 749, FR-B1-3 098 562, FR-B1-3 101 129 and WO-A1-2019/007915.

The role of a mechanical gearbox is to modify the speed and torque ratio between the input axle and the output axle of a mechanical system.

The new generations of double flow turbomachines, in particular those with a high bypass ratio, comprise a mechanical gearbox to drive the shaft of a fan. The usual purpose of the gearbox is to convert the rotational speed referred to as high speed of the shaft of a power turbine into a slower rotational speed for the shaft driving the fan.

A drive system for driving a wheel of a landing gear may also comprise a mechanical gearbox, as proposed by the Applicant in the document EP-A1-3 882 136.

Such a gearbox comprises a central pinion, referred to as sun gear, a ring gear and pinions referred to as planet gears, which are engaged between the sun gear and the ring gear. The planet gears are maintained by a frame referred to as planet carrier. The sun gear, the ring gear and the planet carrier are planetary gears because their axes of revolution coincide with the axis of the turbomachine or of the wheel of a landing gear. The planet gears each have a different axis of revolution equally distributed on the same operating diameter around the axis of the planetaries. These axes are parallel to the longitudinal axis X.

There are several gearbox architectures. In the prior art, the gearboxes are of the planetary or epicyclic type. In other similar applications, there are architectures referred to as differential or "compound".

In a planetary gearbox, the planet carrier is stationary and the ring gear is the output shaft of the device which rotates in the opposite orientation of the sun gear.

In an epicyclic gearbox, the ring gear is stationary and the planet carrier is the output shaft of the device which rotates in the same orientation as the sun gear.

On a compound gearbox, no element is attached in rotation. The ring gear rotates in the opposite orientation of the sun gear and the planet carrier.

The gearboxes can consist of one or more meshing stages. This meshing is ensured in different ways such as by contact, friction or magnetic field. There are several types of contact meshing such as straight, helical or herringbone toothings.

The gearboxes can consist of one or more meshing stages. This meshing is ensured in different ways such as by contact, friction or magnetic field.

A planet gear may comprise one or two meshing stages. In the present application, "stage" or "toothing" means a series of gearing teeth with a series of complementary teeth. A toothing can be internal or external. A single-stage planet gear comprises a toothing that can be straight, helical or herringbone, and whose teeth are located on a same diameter. This toothing cooperates with both the sun gear and the ring gear.

A double-stage planet gear comprises two toothings or two series of teeth that are located on different diameters. A first toothing cooperates with the sun gear and a second toothing cooperates with the ring gear.

There is also a configuration, referred to as Wolfrom, in which the planet gears are double-stage and comprise a first toothing that cooperates with the sun gear and a ring gear, and a second toothing that cooperates with a second ring gear. The gearbox thus comprises two ring gears, one of which is stationary and the other movable.

In order to add flexibility to a gearbox, a conventional solution is to attach the stationary ring gear of the gearbox by means of a ring gear carrier with a "bellows" shape, as described in the patent FR-B1-3 072 749. However, this solution is difficult to fit into a small overall dimension.

Other solutions have been developed to allow the ring gear to absorb the vibrations by incorporating the elastomer springs or pads into the ring gear. However, these solutions do not allow to support the meshing forces correctly without causing significant deformation at the level of the toothing of the ring gear. In addition, the low stiffness of the pads means that they cannot be used in high-power applications.

The document WO-A1-2019/007915 describes a ring gear whose flange comprises radial oil passage notches. These notches have no effect on the flexibility of the ring gear.

Embodiments of the present disclosure provide simple, effective and economical solutions to at least some of these problems.

SUMMARY

In accordance with an aspect of the present disclosure, a ring gear for an aircraft mechanical gearbox is provided. This ring gear has an annular shape around an axis and includes:
- an internal toothing at its internal periphery,
- an external annular flange or splines at its external periphery, and
- an annular web extending between the internal toothing and the external flange or splines,
- wherein the web can include an annular row of arms which are distributed around the axis, these arms connecting the internal toothing to the external flange or splines and being formed in a single piece with the internal toothing and the external flange or splines.

Embodiments of the present disclosure provide flexibility in the ring gear and therefore in the gearbox, while maintaining a small overall dimension. This is made possible by integrating this flexibility into the web of the ring gear, between its toothing and its flange or its splines. This flexibility is generated by the arms, which resemble the spokes of a bicycle wheel, for example. These arms allow the meshing forces to be absorbed in tension or compression, while allowing a flexibility in the radial direction through bending.

The solution proposed below is compatible with a single-stage or multi-stage gearbox. It is compatible with epicyclic, planetary, differential or Wolfrom gearboxes. It is also compatible with straight, helical or herringbone toothings. It is compatible with all types of planet carrier, and in particular with a monobloc planet carrier. It is also compatible with any type of bearing, whether it consists of rolling elements, a hydrodynamic bearing, etc. It is compatible with the use of the ring gear and the gearbox in a double flow turbomachine, for example to drive a fan or a propeller. It is also compatible with the use of the ring gear and of the gearbox in a drive system for driving a wheel of a landing gear.

The ring gear according to the present disclosure may comprise one or more of the following characteristics, taken in isolation from each other, or in combination with each other:
- the arms are separated from each other by spaces, or delimit spaces between them;
- each or at least a portion of the spaces is generally parallelepipedal, trapezoidal, triangular or diamond-shaped;
- the spaces are formed by circular or oblong orifices;
- the web comprises a first annular row of orifices located on a first circumference, and a second annular row of orifices located on a second circumference whose diameter is greater than that of the first circumference, the orifices of the first row being located circumferentially between the orifices of the second row;
- the spaces are empty, i.e. axially through;
- the spaces are filled by blocks made of a material different from the main material of the ring gear, for example polymer;
- the arms are inclined obliquely with respect to a radial direction and have an inclination orientation in the same circumferential direction;
- the arms are all oriented in the same way;
- a first series of the arms is oriented in a first way, and a second series of the arms is oriented in a second way, different from the first way;
- the arms of the first series are intertwined with the arms of the second series;
- the arms are all inclined with respect to radii of the axis;
- the arms are all located in the same plane perpendicular to the axis;
- the number of arms is greater than 2, for example greater than 5 or 10, greater than 20, or between 20 and 100; this number depends, for example, on the diameter of the ring gear.

The present disclosure also relates to a mechanical gearbox for an aircraft, the gearbox comprising:
- a sun gear that is movable in rotation around an axis,
- a ring gear as described above, mounted around the sun gear and the axis, and
- planet gears mounted between the sun gear and the ring gear and meshed with the sun gear and the ring gear, these planet gears having axes of rotation parallel to the axis.

The present disclosure also relates to a turbomachine or a drive system for driving a wheel of landing gear, in particular for an aircraft, comprising at least one ring gear or a mechanical gearbox as described above.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

Figure 1:
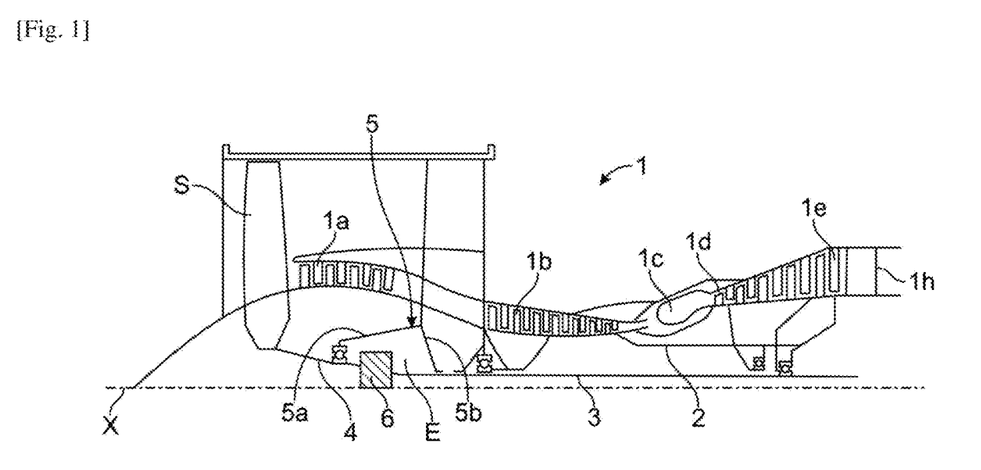
FIG. 1 is a schematic view of an aircraft turbomachine in axial cross-section.

FIG. 1 describes a turbomachine 1 which conventionally comprises a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and together they form a high-pressure (HP) body. The low-pressure compressor 1a and the low-pressure turbine 1e are connected by a low-pressure shaft 3 and together they form a low-pressure (LP) body.

The fan S is driven by a fan shaft 4 which is driven in rotation with the shaft LP 3 by means of a gearbox 6. This gearbox 6 is generally of the planetary or epicyclic type.

Although the following description concerns a gearbox of the planetary or epicyclic type, it also applies to a mechanical differential in which the three components, namely the planet carrier, the ring gear and the sun gear, can be rotatable, the rotational speed of one of these components depending in particular on the difference in speed of the other two components. It also applies to the special case of a Wolfrom-type double-stage gearbox.

The gearbox 6 is positioned in the upstream portion of the turbomachine. A stationary structure comprising schematically, here, an upstream portion 5a and a downstream portion 5b which makes up the engine casing or stator 5 is arranged so as to form an enclosure E surrounding the gearbox 6. This enclosure E is here closed upstream by seals at the level of a bearing allowing the passage of the fan shaft 4, and downstream by seals at the level of the passage of the LP shaft 3.

Figure 2:
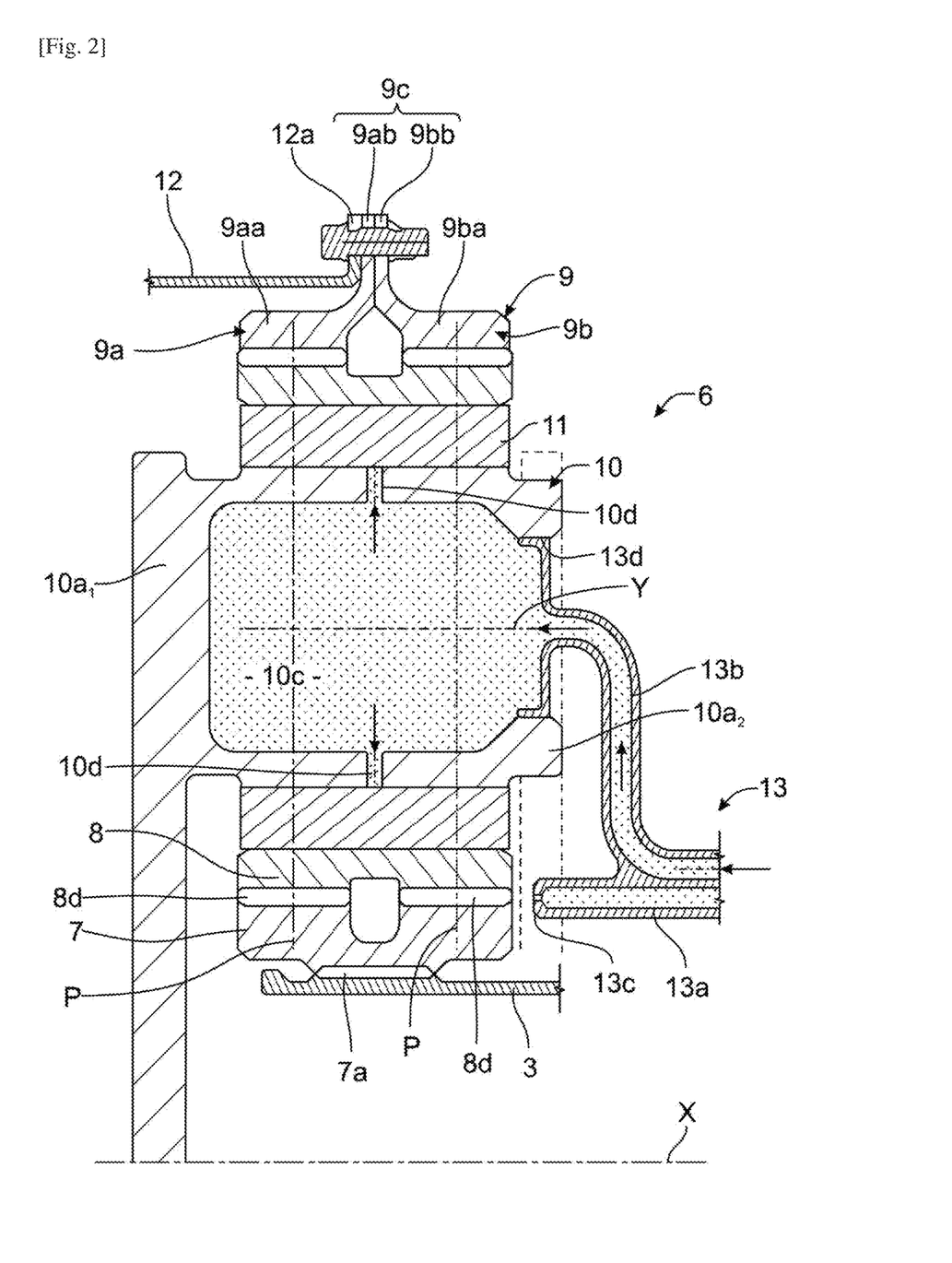
FIG. 2 is a partial schematic view of a mechanical gearbox in axial cross-section.

FIG. 2 shows a gearbox 6 which can take the form of different architectures depending on whether certain parts are stationary or in rotation. The input of the gearbox 6 is connected to the LP shaft 3, for example by means of internal splines 7a. Thus the LP shaft 3 drives a planetary pinion referred to as the sun gear 7. Typically, the sun gear 7, whose axis of rotation coincides with that of the turbomachine X, drives a series of pinions referred to as planet gears 8, which are distributed over the same diameter around the axis of rotation X. This diameter is equal to twice the operating center distance between the sun gear 7 and the planet gears 8. The number of planet gears 8 is generally defined between three and seven for this type of application.

The assembly of the planet gears 8 are held by a planet carrier 10. Each planet gear 8 rotates around its own axis Y, and meshes with the ring gear 9.

In the output we have:
(1) in an epicyclic configuration, the assembly of the planet gears 8 drives the planet carrier 10 in rotation around the axis X of the turbomachine. The ring gear is attached to the engine casing or stator 5 via a ring gear carrier 12 and the planet carrier 10 is attached to the fan shaft 4; and
(2) in a planetary configuration, the assembly of the planet gears 8 is maintained by a planet carrier 10 which is attached to the engine casing or stator 5. Each planet gear drives the ring gear which is fitted to the fan shaft 4 via a ring gear carrier 12.

Each planet gear 8 is mounted so that it can rotate freely by means of a bearing 11, for example a hydrodynamic bearing or plain bearing. In the case of a plain bearing, the bearing 11 comprises a bearing body 10b and the bearing bodies 10b of the various plain bearings are positioned relative to one another and are carried by walls 10a1, 10a2 of the planet carrier 10.

The walls 10a1, 10a2 are annular and perpendicular to the axis X. They are axially spaced apart and receive between them the bearings 11, the planet gears 8 and the sun gear 7.

The number of bearings 11 is equal to the number of planet gears 8. For reasons of operation, assembly, manufacture, inspection, repair or replacement, the bearings 11 (and in particular the bearing bodies 10b) and the walls 10a1, 10a2 can be separated into several parts.

For the same reasons mentioned above, the toothing 8d of a gearbox can be separated into several propellers each with a median plane P. In our example, we detail the operation of a gearbox with several propellers with one ring gear separated into two half-ring gears;

an upstream half-ring gear 9a consisting of a rim 9aa and an attachment half-flange 9ab. On the rim 9aa there is the upstream propeller of the toothing of the gearbox. This upstream propeller meshes with that of the planet gear 8 which meshes with that of the sun gear 7.

a downstream half-ring gear 9b consisting of a rim 9ba and an attachment half-flange 9bb. On the rim 9ba is the downstream propeller of the toothing of the gearbox. This downstream propeller meshes with that of the planet gear 8 which meshes with that of the sun gear 7.

If the propeller widths vary between the sun gear 7, the planet gears 8 and the ring gear 9 because of the toothing overlaps, they are all centered on a median plane P for the upstream propellers and on another median plane P for the downstream propellers.

The mounting half-flange 9ab of the upstream ring gear 9a and the mounting half-flange 9bb of the downstream ring gear 9b form the attachment flange 9c of the ring gear. The ring gear 9 is attached to a ring gear carrier by assembling the attachment flange 9c of the ring gear and the attachment flange 12a of the ring gear carrier by means of a bolted mounting, for example.

Alternatively, the flange 9c of the ring gear 9 could be replaced by splines.

The arrows in FIG. 2 describe the conveying of the oil in the gearbox 6. The oil arrives in the gearbox 6 from the stator portion 5 in the dispenser 13 by different means which will not be specified in this view because they are specific to one or several types of architecture. The dispenser is divided into two portions, each of which is generally made up of the same number of planet gears. The function of the injectors 13a is to lubricate the toothings and the function of the arms 13b is to lubricate the bearings 11. The oil is fed towards injectors 13a and emerges through ends 13c so as to lubricate the toothings of the planet gears 8, the sun gear 7 and also the ring gear 9 with oil. The oil is also fed towards the arm 13b and circulates via the supply mouth 13d of the bearing body 10b into an internal cavity 10c of the latter. The oil then circulates in this cavity 10c to supply oil passage orifices 10d up to an external cylindrical surface for guiding the corresponding planet gear.

The present disclosure relates to a ring gear for an aircraft mechanical gearbox 6. This gearbox 6 may be of the type described above or of another type, for example a Wolfrom-type double-stage gearbox. This gearbox 6 can also be used in a turbomachine 1 such as that shown in FIG. 1, to drive a fan S, or in another context such as in a drive system for driving a wheel for an aircraft landing gear (see FIG. 10).

It should be noted that the ring gear according to the present disclosure can be the only ring gear of the gearbox 6, and can be a stationary or movable ring gear. Alternatively, the gearbox 6 could comprise two ring gears in accordance with the present disclosure. One of these ring gears could be stationary and the other movable. The two ring gears could also be stationary or movable. By way of example, each of these two ring gears could be assimilated to a half-ring gear as illustrated in FIG. 2, the two ring gears (or half-ring gears) then being attached together and to a ring gear holder by their flanges or splines.

Figure 3:
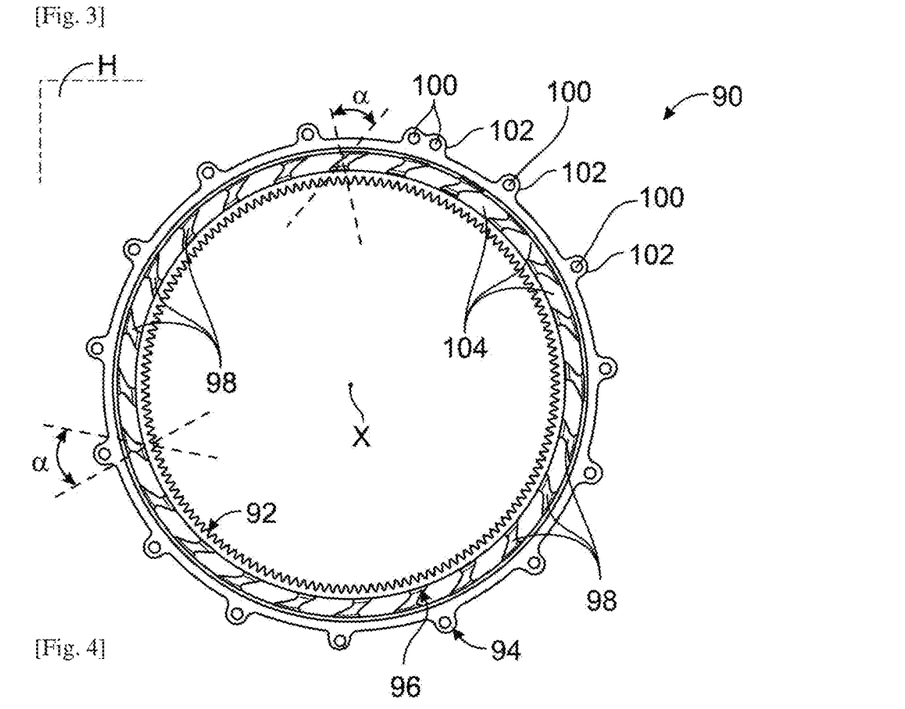
FIG. 3 is a schematic front view of a ring gear according to a first embodiment of the present disclosure.
Figure 4:
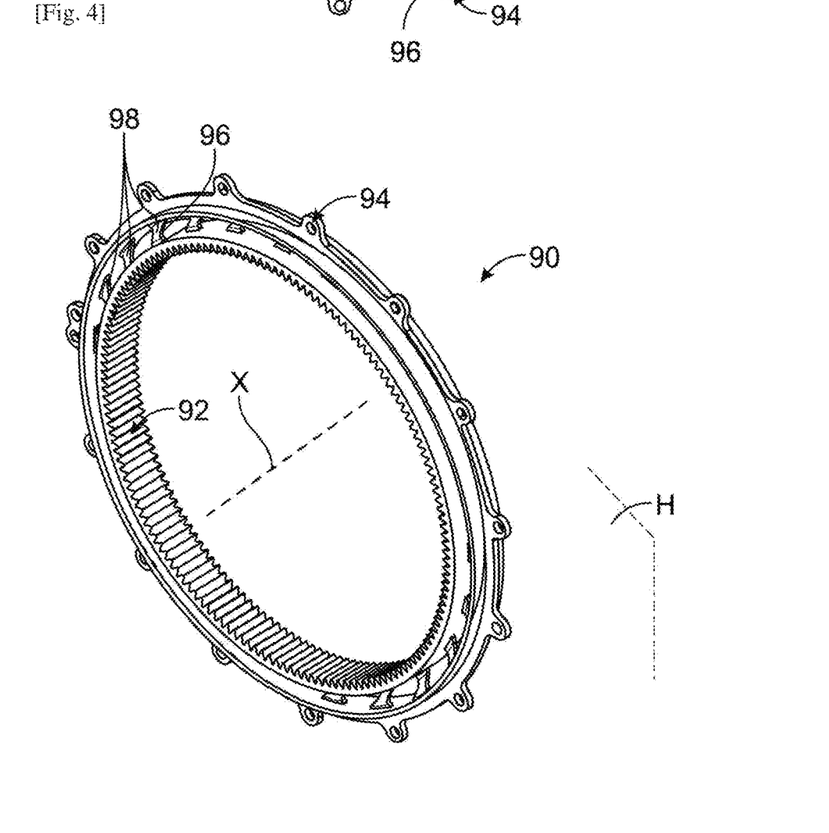
FIG. 4 is another schematic perspective view of the ring gear in FIG. 3.
Figure 5:
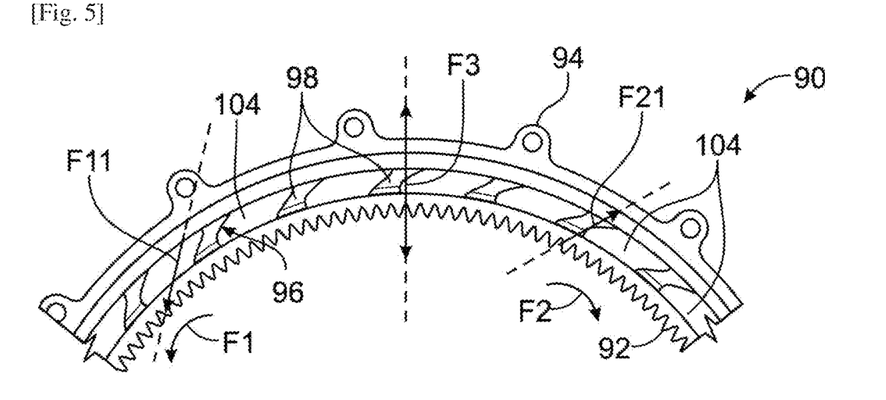
FIG. 5 is a schematic partial perspective view of the ring gear in FIG. 3.
Figure 6:
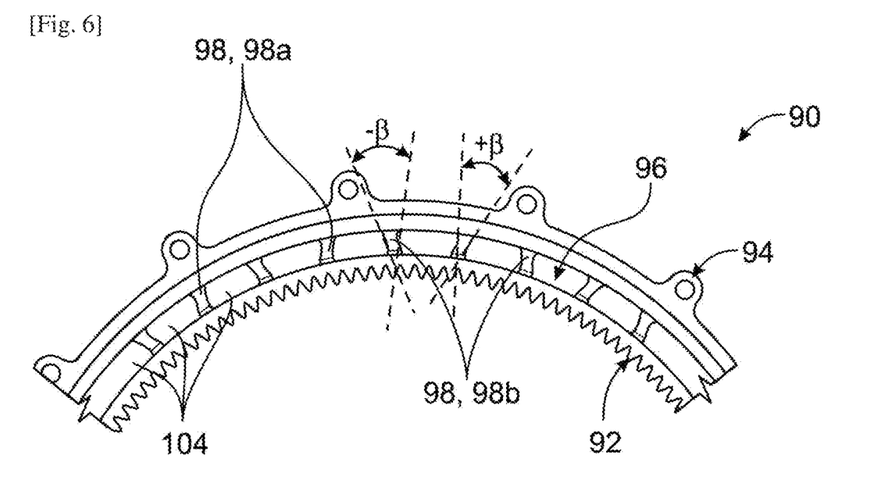
FIG. 6 is a similar view to FIG. 5 and illustrates a variant of embodiment of the present disclosure

FIGS. 3 to 5 illustrate a first embodiment of a ring gear 90 according to the present disclosure, and FIG. 6 and following illustrate alternative embodiments of this ring gear 90.

The ring gear 90 can be made of metal. Its main material is therefore a metallic alloy.

The ring gear 90 of FIGS. 3 to 5 has an annular shape around the axis X and comprises:
an internal toothing 92 at its internal periphery,
an external annular flange or splines 94 at its external periphery, and
an annular web 96 extending between the internal toothing 92 and the external flange or the splines 94.

The particularity of this ring gear 90 is that its web 96 comprises an annular row of arms 98 which are distributed around the axis X, these arms connecting the internal toothing 92 to the flange or the splines 94 and being formed in a single piece with the internal toothing 92 and the flange or the splines 94.

The toothing 92 is straight in the example shown but could alternatively be helical.

In the example shown, the flange 94 comprises a plurality of axial orifices 100 for the passage of attachment elements of the screw or bolt type. These orifices 100 are formed in ears radially external 102 of the flange 94. These ears 102 are distributed around the axis X. Alternatively, the orifices 100 could be formed in a continuous annular wall of the flange 94.

The flange or the splines 94 is/are located in a plane H which is perpendicular to the axis X and which passes through the middle of the toothing 92 in the example shown.

The arms 98 can extend in this plane H.

In the embodiment shown in FIGS. 3 to 5, the arms 98 are evenly distributed around the axis X and are spaced apart. They all have the same orientation and are inclined in the same direction with respect to radii of the axis X. The angle α of inclination of each arm is, for example, between 20 and 70°.

If the planet gears meshed with the ring gear 90 were to rotate in the direction of the arrow F1, each of the arms 98 would be subjected to tensile stress in a direction aligned with the axis of elongation of this arm 98 (arrow F11—FIG. 5). If the planet gears meshed with the ring gear 90 rotate in the direction of the arrow F2, each of the arms 98 would be subjected to compressive stress in a direction aligned with the axis of elongation of that arm (arrow F21—FIG. 5). In addition, the web 96 and therefore the ring gear 90 are flexible in the radial direction according to the arrow F3.

The arms 98 define spaces 104 between them, which are empty and here have a generally parallelepiped shape.

Each of the arms 98 comprises a first radially external end for connection to the flange or the splines 94, and a second radially internal end for connection to the toothing 92. These ends can be widened in relation to the rest of the arm and in particular to the middle portion of the arm, as can be seen in FIG. 5.

Generally speaking, because of the spaces 104 created between the arms 98, these arms can be oversized to withstand the forces during operation, without significantly impacting the mass of the ring gear 90. This over-dimensioning can be done, for example, in a direction parallel to the axis X, the arms 98 having, for example, a width in this direction which is greater than the width of a ring gear web in the previous technique.

Furthermore, the arms 98 can have any cross-sectional shape, for example square, rectangular, round, elliptical, etc. This cross-sectional shape can also vary along the axis of elongation of the arm 98.

The variant of embodiment shown in FIG. 6 differs from the previous embodiment in that one series, for example half, of the arms 98, 98a is oriented in a first way, and a second series, for example half, of the arms 98, 98b is oriented in a second way, different from the first way.

The arms 98, 98a are, for example, inclined at a positive angle +β to radii of the axis X, and the arms 98, 98b are, for example, inclined at a negative angle −β to radii of the axis X.

The arms 98 define empty spaces 104 between them, which are generally trapezoidal in shape. A first series of trapezoids have their small bases located outside their large bases, and the other series of trapezoids, arranged between the trapezoids of the first series, have their small bases located inside their large bases.

The ends of the arms 98 are also widened.

Figure 7:
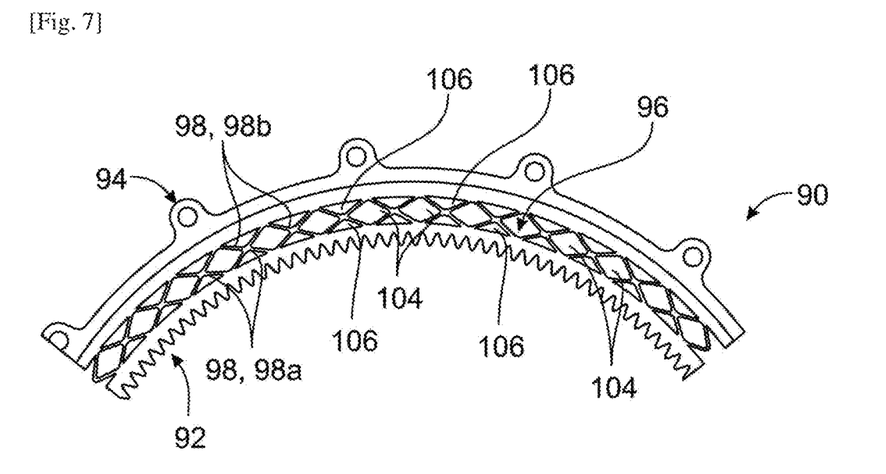
FIG. 7 is a similar view to FIG. 5 and illustrates another variant of embodiment of the present disclosure.

The variant of embodiment shown in FIG. 7 differs from the previous embodiment in that the arms 98, 98a of the first series are intertwined with the arms 98, 98b of the second series.

The arms 98 define between them spaces 104, 106 which are empty and have here general triangular and diamond shapes. A pair of intertwined arms 98a, 98b together define two triangular spaces 106 located respectively inside and outside the arms 98a, 98b. Two pairs of adjacent arms 98a, 98b define a diamond-shaped space 104 between them.

Figure 8:
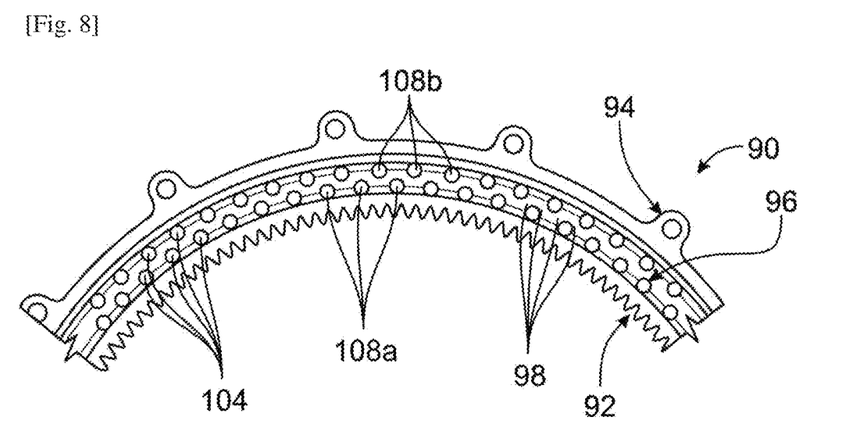
FIG. 8 is a similar view to FIG. 5 and illustrates another variant of embodiment of the present disclosure.

The variant of embodiment shown in FIG. 8 differs from the previous embodiments in that the empty spaces 104 between the arms 98 are formed by circular orifices 108a, 108b.

The web 96 comprises a first annular row of orifices 108a located on a first circumference, and a second annular row of orifices 108b located on a second circumference whose diameter is greater than that of the first circumference, the orifices 108a of the first row being located between the orifices 108b of the second row.

Figure 9:
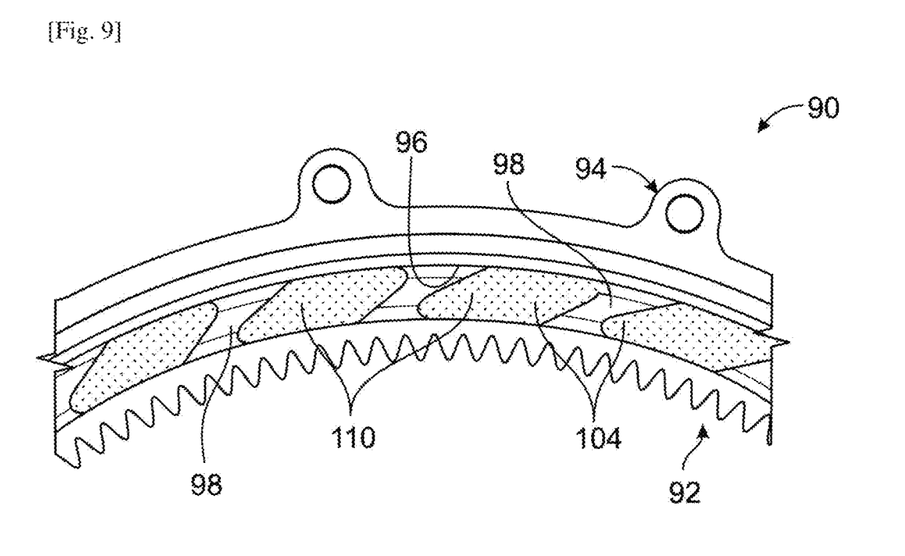
FIG. 9 is a similar view to FIG. 5 and illustrates another variant of embodiment of the present disclosure.

The variant of embodiment shown in FIG. 9 differs from the first embodiment in that the spaces 104 are filled with blocks 110 made of a material other than the main material of the ring gear, for example polymer. The polymer is, for example, chosen from: polyetheretherketone, polyamide, polyimide, bismaleimide, epoxy, phenoplasts (e.g. polystyrene), polyesters, polyurethanes, silicone rubbers, nylons, copolymers, polymer blends, etc.

The blocks 110 can be designed to take up some of the meshing forces, thereby reducing the cross-section of the arms 98 to save weight.

The spaces 104, 106 between the arms 98 of the other variants of embodiment of FIGS. 6 to 8 could also be filled with similar blocks 110.

The number of arms 98 of the ring gear 90 is, for example, greater than 2, 5 or 10, greater than 20, or between 20 and 100. This number depends in particular on the loading level of the toothing 92 of the ring gear 90 during operation. A lightly loaded ring gear 90 will have a lower number of arms 98 than a more heavily loaded ring gear during operation. Similarly, the inclination of the arms 98 will depend on the loading of the ring gear 90 and the desired flexibility.

Figure 10:
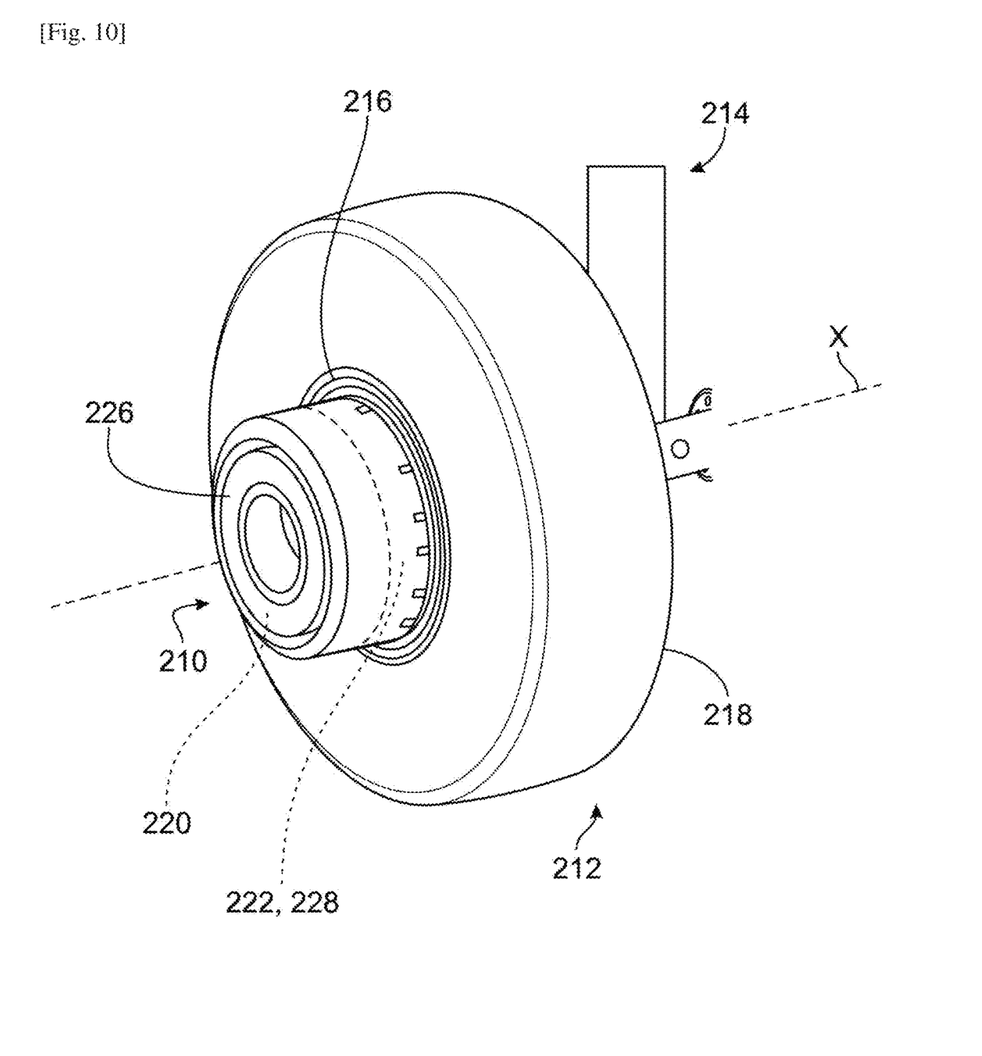
FIG. 10 is a schematic perspective view of a wheel of an aircraft landing gear and a drive system for driving this wheel.

FIG. 10 shows a drive system 210 for driving at least one wheel 212 of an aircraft landing gear 214.

The wheel 212 comprises a rim 216 with an axis of rotation X. Conventionally, this rim 216 is generally tubular or disc-shaped and carries a tyre 218 on its periphery.

The system 210 comprises an electric motor 220 and a mechanical transmission system 222 between a shaft of the motor 220 and the rim 216 of the wheel 212.

In the example shown, the motor 220 and the system 222 each have a generally annular shape and are centred on the axis X. They are arranged next to each other and the system 222 is installed between the motor 220 and the rim 216. Part of the system 222, or even part of the motor 220, could be housed in the rim 16 to reduce the overall dimension of the system 210. The motor 220 and the system 222 can be protected by an outer cylindrical cowl 226 projecting from one side of the rim 216 or of the tyre 218.

The mechanical transmission system 222 comprises a mechanical gearbox 228 similar to the gearbox 6 described above.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 10% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A ring gear for an aircraft mechanical gearbox, the ring gear having an annular shape about an axis and comprising:
    an internal toothing at its internal periphery;
    an external annular flange or splines at its external periphery; and
    an annular web extending between the internal toothing and the external flange or splines,
    wherein the web includes an annular row of arms which are distributed around the axis, the arms connecting the internal toothing to the external flange or splines and being formed in a single piece with the internal toothing and the external flange or splines.

2. The ring gear of claim 1, wherein the arms are separated from one another by spaces, or delimit spaces between them.

3. The ring gear of claim 2, wherein each of or at least a portion of the spaces is generally parallelepipedal, trapezoidal, triangular, or diamond-shaped.

4. The ring gear of claim 2, wherein the spaces are formed by circular or oblong orifices.

5. The ring gear of claim 4, wherein the web has a first annular row of orifices located on a first circumference, and a second annular row of orifices located on a second circumference whose diameter is greater than that of the first circumference, the orifices of the first row being located circumferentially between the orifices of the second row.

6. The ring gear of claim 2, wherein the spaces are empty.

7. The ring gear of claim 2, wherein the spaces are filled by blocks made of a material different from the main material of the ring gear.

8. The ring gear of claim 7, wherein the blocks are made of a polymer material.

9. The ring gear of claim 1, wherein the arms are inclined obliquely to a radial direction and have an inclination orientation in the same circumferential direction.

10. The ring gear of claim 1, wherein a first series of the arms is oriented in a first way, and a second series of the arms is oriented in a second way different from the first way.

11. The ring gear as claimed in claim 10, wherein the arms of the first series are intertwined with the arms of the second series.

12. The ring gear of claim 1, wherein the arms are all located in the same plane perpendicular to the axis.

13. The ring gear of claim 1, wherein the number of arms is greater than 2, greater than 5 or 10, greater than 20, or between 20 and 100.

14. The ring gear of claim 1, wherein the arms are all oriented in the same way, and in particular they are all inclined with respect to the radii of the axis.

15. A mechanical gearbox for an aircraft, the gearbox comprising:
    a sun gear movable in rotation about an axis;
    a ring gear according to claim 1 mounted around the sun gear and the axis; and
    planet gears mounted between the sun gear and the ring gear and meshed with the sun gear and the ring gear, the planet gears having axes of rotation parallel to the axis.

16. A turbomachine for an aircraft having at least one ring gear according to claim 1.

17. A turbomachine for an aircraft having at least one mechanical gearbox according to claim 15.

18. A drive system for driving a wheel of a landing gear of an aircraft, the drive system having at least one ring gear according to claim 1.

19. A drive system for driving a wheel of a landing gear of an aircraft, the drive system having at least one mechanical gearbox according to claim 15.

* * * * *